(12) United States Patent
Demanze

(10) Patent No.: US 10,890,275 B2
(45) Date of Patent: Jan. 12, 2021

(54) UNDERWATER PIPE COMPRISING A SHEATH COMPRISING A POLYPROPYLENE BLOCK COPOLYMER

(71) Applicant: TECHNIP FRANCE, Courbevoie (FR)

(72) Inventor: Frédéric Demanze, Caudebec en Caux (FR)

(73) Assignee: TECHNIP FRANCE

( * ) Notice: Subject to any disclaimer, the term of this patent is extended or adjusted under 35 U.S.C. 154(b) by 311 days.

(21) Appl. No.: 16/090,695

(22) PCT Filed: Apr. 5, 2017

(86) PCT No.: PCT/EP2017/058129
§ 371 (c)(1),
(2) Date: Oct. 2, 2018

(87) PCT Pub. No.: WO2017/174664
PCT Pub. Date: Oct. 12, 2017

(65) Prior Publication Data
US 2020/0326020 A1      Oct. 15, 2020

(30) Foreign Application Priority Data

Apr. 6, 2016   (FR) ..................................... 16 53015

(51) Int. Cl.
*F16L 9/12* (2006.01)
*B32B 27/32* (2006.01)
(Continued)

(52) U.S. Cl.
CPC .............. *F16L 9/12* (2013.01); *B29C 48/022* (2019.02); *B29C 48/09* (2019.02); *B32B 1/08* (2013.01);
(Continued)

(58) Field of Classification Search
CPC .......... F16L 9/12; B32B 27/32; B32B 15/085; B32B 27/22; B32B 15/02; B32B 1/08;
(Continued)

(56) References Cited

U.S. PATENT DOCUMENTS 4,606,953 A    8/1986   Suzuki et al. .................. 428/36

FOREIGN PATENT DOCUMENTS

FR      3 020 440 A1    10/2015
JP      2003-245974 A    9/2003
(Continued)

OTHER PUBLICATIONS

International Search Report dated Jul. 13, 2017 in corresponding PCT International Application No. PCT/EP2017/058129.
(Continued)

*Primary Examiner* — Michael C Miggins
(74) *Attorney, Agent, or Firm* — Ostrolenk Faber LLP

(57) ABSTRACT

An underwater pipe including a metal reinforcing layer around an inner polymeric sealing sheath which may be in contact with hydrocarbons. The inner polymeric sealing sheath includes a polypropylene block copolymer or a mixture of polypropylene block copolymers, wherein the polypropylene block copolymer or the mixture has a density greater than 0.900 g/cm3, and a melt index measured at 230° C. under a mass of 2.16 kg of less than 10 g/10 minutes, its preparation method and its use for the transport of hydrocarbons. Such a sheath may be used in contact with hydrocarbons at high temperature.

15 Claims, 1 Drawing Sheet

(51) Int. Cl.
  *B32B 15/085* (2006.01)
  *B29C 48/09* (2019.01)
  *B29C 48/00* (2019.01)
  *F17D 1/00* (2006.01)
  *B32B 27/22* (2006.01)
  *B32B 15/02* (2006.01)
  *B32B 1/08* (2006.01)
  B29K 23/00 (2006.01)
  B29L 23/00 (2006.01)

(52) U.S. Cl.
  CPC ............ *B32B 15/02* (2013.01); *B32B 15/085* (2013.01); *B32B 27/22* (2013.01); *B32B 27/32* (2013.01); *F17D 1/00* (2013.01); B29K 2023/12 (2013.01); B29K 2995/004 (2013.01); B29K 2995/0063 (2013.01); B29L 2023/22 (2013.01); B32B 2250/05 (2013.01); B32B 2307/308 (2013.01); B32B 2307/704 (2013.01); B32B 2307/72 (2013.01); B32B 2307/7265 (2013.01); B32B 2597/00 (2013.01)

(58) Field of Classification Search
  CPC ...... B32B 2307/7265; B32B 2307/704; B32B 2307/72; B32B 2597/00; B32B 2250/05; B32B 2307/308; B29C 48/09; B29C 48/022; F17D 1/00; B29K 2023/12; B29K 2995/004; B29K 2995/0063; B29L 2023/22
  See application file for complete search history.

(56) References Cited

FOREIGN PATENT DOCUMENTS

JP    2006-335780 A    12/2006
WO    WO 2006/120320 A1    11/2006
WO    WO 2013/128097 A1    9/2013

OTHER PUBLICATIONS

Written Opinion dated Jul. 13, 2017 in corresponding PCT International Application No. PCT/EP2017/058129.
Preliminary Search Report dated Nov. 30, 2016 in corresponding French Patent Application No. 1653015.

UNDERWATER PIPE COMPRISING A SHEATH COMPRISING A POLYPROPYLENE BLOCK COPOLYMER

CROSS-REFERENCE TO RELATED APPLICATIONS

The present application is a 35 U.S.C. §§ 371 national phase conversion of PCT/EP2017/058129, filed Apr. 5, 2017, which claims priority to French Patent Application No. 16 53015, filed Apr. 6, 2016, the contents of which are incorporated herein by reference. The PCT International Application was published in the French language.

TECHNICAL FIELD

The present invention relates to an underwater pipe for the transport of hydrocarbons in deep water.

BACKGROUND OF THE INVENTION

These pipes are likely to be used under high pressures, above 100 bar, or even up to 1000 bar, and at high temperatures, above 130° C., or even 170° C., for long periods of time, i.e. several years, typically 20 years.

Underwater pipes for the transport of hydrocarbons in deep water comprise a metal reinforcing layer around an inner polymeric sealing sheath in which hydrocarbons flow.

The constituent material of the inner polymeric sealing sheath must be chemically stable and able to mechanically resist the fluid transported and its properties (composition, temperature and pressure). The material must combine properties of ductility, resistance to weather (generally a pipe life of at least 20 years), and mechanical resistance to heat and pressure. The material must, in particular, be chemically inert with respect to the chemical compounds constituting the transported fluid. Typically, the hydrocarbons transported comprise crude oil, water, and pressurized gases, such as hydrogen sulphide ($H_2S$) in a concentration generally of the order of 100 ppm, carbon dioxide ($CO_2$) generally at a pressure between 1 bar and 100 bar, and methane ($CH_4$) generally at a pressure between 1 bar and several hundred bar. The organic acids may, for example be benzoic acid, methanoic acid and/or acetic acid. These increase the acidity of crude oil (between 0.1 and 8 TAN, for example). This acidity may lead to the premature degradation of certain polymers, such as polyamides.

An underwater pipe may be flexible or rigid. The inner polymeric sealing sheath of a rigid underwater pipe is generally based on polyethylene.

Various polymeric materials are used in a inner polymeric sealing sheath for an underwater flexible pipe, for example:
polyethylene, especially high density polyethylene, for low temperature applications (typically below 80° C.),
polyamide (PA), in particular polyamide 11. In contrast to polyethylene, polyamide has good blistering resistance when it is pressurized and at temperature, as well as a low swelling tendency when in contact with the petroleum fluid. The polyamide is generally used under conditions of hydrocarbon transport for which the pressure is high and where the temperature preferably remains below 90° C., or even for a temperature which may rise up to 110° C.

On the other hand, one of the drawbacks of polyamide is that it tends to hydrolyze in the presence of water (often contained in production crudes) (chemical aging). Hydrolysis is rapid when subjected to temperatures (of the order of 110° C. and above) and low pH values (pH below 7). Another drawback is its purchase cost which is significantly greater than that of polyethylene.

polyvinylidene fluoride (PVDF) has a very good chemical inertness. PVDF sheaths can withstand high operating pressures and temperatures up to 130° C.–150° C.

Its major drawback is its price that is much higher than that of polyethylene or polyamide. In addition, some PVDF are sensitive to cavitation, which limits its use as the sheath of a flexible pipe. Under the effect of the internal pressure in the flexible pipe, the polymeric sheath, which is relatively flexible, is pressed against the inner face of the pressure vault. The part of the polymeric sheath which is not locally supported by the reinforcing layer (i.e. the part opposite the gap) deforms under the effect of pressure. This phenomenon of deformation of the polymeric sheath in the gaps of the reinforcing layer is called creep or extrusion of the polymeric sheath. Under these conditions, these deformations may be at the origin of the appearance of cavitations on the polymeric sheath. Cavitation is the appearance and/or growth of micro vacuums in matter in response to mechanical stress (deformation). This phenomenon may or may not be associated with stress whitening of the material. These cavitations may eventually lead to the appearance of cracks and a loss of tightness of the polymeric sheath.

The use of thermoplastic materials in flexible pipes is summarized in section 6.2.2 of API RP 17B (2008).

The development of cheaper alternative inner polymer sheaths with properties compatible with their use in contact with high temperature hydrocarbons (low swelling, low sensitivity to cavitation, good mechanical resistance, especially creep . . . , good chemical resistance to hydrocarbon components), is sought.

The application WO 2013/128097 discloses an underwater flexible pipe for the transport of hydrocarbons in deep water comprising an inner polymeric sealing sheath. Polypropylene is mentioned in a long list of polymers that may be used for this sheath.

Polypropylene is used in the offshore oil industry. Indeed, it is widely used for its thermal insulation properties (its thermal conductivity is close to 0.2 W/m/K). It is also used for tubes intended for the transport of water or gas. These are subjected to pressures and temperatures much lower than the pipes intended for the transport of hydrocarbons, while the mechanical stresses are lower. Indeed, the pipes intended for the transport of hydrocarbons are dynamic and may be subjected to loads (thermal shocks, dynamism) at low temperature (in particular during a shutdown of production). Furthermore, upon extruding on a mechanical support such as a metal carcass, the polymer undergoes significant shrinkage stresses. These hoop constraints may be of such a nature as to make the phenomenon of rapid crack propagation possible. The polymer must therefore be resistant to cold shocks in order to prevent fracture and the so-called crack propagation. A polymer designed to form the sheath of a pipe for the transport of gas or hydrocarbons is not necessarily suitable to form the sheath of an underwater flexible pipe for the transport of hydrocarbons.

In this regard, polypropylenes are not used in applications in which they could be in contact with hydrocarbons.

A polymer has more or less affinity with a given fluid/solvent. When the affinity of the polymer with a fluid is significant, the polymer swells, delaminates, and may even partially or completely dissolve in the fluid, wherein these phenomena are all the more exacerbated when the temperature is significant. In this case, the technical data sheets of the suppliers advise against the use of polypropylenes in contact with the hydrocarbons insofar as polypropylene is described therein as being incompatible with hydrocarbon compounds, in particular at high temperatures. Upon contact with hydrocarbons, a matrix based on polypropylene has a tendency to swell. Polypropylenes may dissolve partially or completely in oils at high temperatures by swelling and/or delamination phenomena.

In addition, polypropylene is subject to blistering, a phenomenon which occurs after saturation of the material in hydrocarbons followed by a more or less rapid depressurization, which is problematic for use in the layer of a pipe. More specifically, in a pipe, the sealing sheath of polymer material is used to transport fluids comprising crude oil, water and gas under pressure and at temperature. Under these conditions of use, the polymer material of the sealing sheath absorbs the gases and oils contained in the petroleum fluid according to their chemical nature (via their solubility coefficient) and the partial pressure of each of them. The saturation time of the polymer, the balancing of the system, depends in turn on the diffusion coefficients and, therefore, essentially on the temperature. If the pressure in the pipe decreases, the absorbed gases tend to exit the polymer in order to maintain the balance between the internal and external concentrations. If the break in balance is very fast, faster than the rate of diffusion of gases from the polymer (as in the case of a production shut-down), the system is no longer in balance. The supersaturation of gas in the polymer sheath leads to gas concentration and temperature gradients which may cause more or less rapid gas decompression that may lead to irreversible damage such as the appearance of blisters or cracks or the formation of a uniformly-distributed microporosity in the thickness of the material. Thus, the appearance of blisters is due to the trapping of soluble gases within the sheath, or the too rapid decompression of the pipe that does not allow the gas to exit the sheath. This phenomenon of blistering may be catastrophic for the sealing sheath, and thus for the underwater pipe that contains it, since it can lead to the loss of its sealing function.

These drawbacks of polypropylene have led those skilled in the art to abandon polypropylene as a polymer for an inner sealing sheath in contact with hydrocarbons in favor of the thermoplastic polymers mentioned above.

SUMMARY OF THE INVENTION

One of the objects of the present invention is to provide an underwater pipe for the transport of hydrocarbons whose inner polymeric sealing sheath is less expensive than polyamide or polyvinylidene fluoride sheaths, while experiencing low swelling and/or low blistering upon contact with hydrocarbons at elevated temperatures, typically above 90° C.

For this purpose, the invention has a first object of providing an underwater pipe intended for the transport of hydrocarbons and comprising a metal reinforcing layer around an inner polymeric sealing sheath capable of being in contact with hydrocarbons, wherein the inner polymeric sealing sheath comprises a polypropylene block copolymer or a mixture of polypropylene block copolymers, wherein the polypropylene block copolymer or the mixture has:
  a density (according to ISO 1183 revised in 2012) of more than 0.900 g/cm$^3$, and
  an index melt (also called melt index (MI), melt flow index (MFI), melt flow rate (MFR) (according to ISO 1133 revised in 2011) measured at 230° C. under a mass of 2.16 kg of less than 10 g/10 minutes.

DESCRIPTION OF PREFERRED EMBODIMENTS

The term "inner polymeric sealing sheath capable of being in contact with hydrocarbons" or "layer capable of being in contact with hydrocarbons" is understood to mean that the sheath or layer comes into contact with hydrocarbons when the pipe is put into operation. Thus, the pipe does not include an inner tubular layer (i.e. a hydrocarbon-proof layer) which would prevent contact between the hydrocarbons and the sheath or the layer. Typically, the pipe according to the invention does not comprise a metal tube or a polymeric tubular layer coated by the inner polymeric sealing sheath.

However, the pipe according to the invention may comprise one (or more) tubular layers coated by the inner polymeric sealing sheath if the tubular layer(s) is/are not hydrocarbon-proof. For example, the underwater pipe may comprise a tubular layer consisting of wound longitudinal elements (for example a metal carcass) coated by the inner polymeric sealing sheath, because the hydrocarbons can pass through the longitudinal elements.

Of course, the pipe may comprise tubular layers (metal and/or polymeric) around the inner polymeric sealing sheath and/or around the reinforcing layer, in particular, as described below.

There are three main classes of polypropylene, namely, homopolymers (PPH), block copolymers (also known as impact copolymer) (PPB) and random copolymers (PPR) (these designations are according to the standards ISO 15013 revised in 2015 and ISO 1873-2 revised in 2011). A polypropylene block copolymer comprises at least one polypropylene block and at least one block obtainable by polymerization of an α-alpha olefin, generally ethylene. By way of example, the polypropylene block copolymer is obtained in two steps consisting of:
  homopolymerization of a polypropylene in a first reactor, and
  copolymerization of a propene and ethylene in a second reactor.

Then the copolymer is distributed within the chain of the homopolymer forming the polypropylene block copolymer. Generally, the proportion by weight of propene/ethylene copolymer represents between 5% and 25% of the polypropylene block copolymer. A polypropylene block copolymer is structurally different from a polypropylene random copolymer (PPR), such as a polypropylene random crystalline temperature (PP-RCT). In particular, a polypropylene block copolymer may be distinguished from a random polypropylene copolymer through:
  differential scanning calorimetry (DSC). A single peak corresponding to the melting temperature of the polypropylene random copolymer is observed. Conversely, for a block copolymer, two distinct peaks corresponding to the melting temperatures of the polypropylene block copolymer (PP and PE for example) are observed.
  Dynamic Mechanical Analysis (DMA), which measures the glass transition temperature (Tg). In the case of the polypropylene random copolymers, there is a single Tg having an intermediate value at the Tg value for each of the homopolymers, whereas for the polypropylene block copolymers two Tg are observed.

Against all odds and against the prejudices mentioned above, it has been discovered that a specific selection of a grade of polypropylene, namely block copolymers having a specific melt index and density, does not present the drawbacks of swelling and blistering mentioned above, and is therefore suitable for use in an inner polymeric sealing sheath that is intended to come into contact with hydrocarbons.

When the inner polymeric sealing sheath comprises a mixture of polypropylene block copolymers, it is not mandatory that each polypropylene block copolymer that it contains has the density and melt index as defined in the present application. It is sufficient that the mixture has these properties. In a particular embodiment, each polypropylene block copolymer of the polypropylene block copolymer mixture has a density and a melt index as defined herein.

The inner polymeric sealing sheath comprises a polypropylene block copolymer or a mixture of polypropylene block copolymers whose density (according to ISO 1183 revised in 2012) is greater than 0.900 g/cm$^3$, typically greater than 0.902 g/cm$^3$, especially greater than 0.905 g/cm$^3$, preferably greater than 0.910 g/cm$^3$. Such densities allow the block copolymer or the mixture (and thus the inner polymeric sealing sheath) to have a swelling ratio and resistance to blistering in the presence of hydrocarbons at high temperature that are compatible with the use of the sheath as a sealing sheath that is intended to be in contact with hydrocarbons in a pipe for the transport of hydrocarbons.

The inner polymeric sealing sheath comprises a polypropylene block copolymer or a mixture of polypropylene block copolymers whose melt index (according to ISO 1133 revised in 2011) measured at 230° C. under a mass of 2.16 kg is less than 10 g/10 minutes, typically less than 5 g/10 minutes, especially less than 2 g/10 minutes, preferably less than 0.5 g/10 minutes. Such melt indices indeed allow the preparation of the sheath by extrusion in diameters greater than 40 cm.

Generally, the polypropylene block copolymer or the polypropylene block copolymer mixture of the inner polymer sheath of the pipe has:
- a density (according to ISO 1183 revised in 2012) of not more than 0.915 g/cm$^3$, and/or
- a melt index (according to ISO 1133 revised in 2011) measured at 230° C. under a mass of 2.16 kg of greater than 0.1 g/10 minutes.

By way of example of polypropylene block copolymers having these properties, mention may be made of polypropylene block copolymers of:
Total PPC 1640 with a density of 0.905 and an MFR of 0.3 measured at 230° C. and under 2.16 kg, or
Total PPC 1645 with a density of 0.905 and a melt index of 0.3 measured at 230° C. and under 2.16 kg, or
PP H2222 36 of Lyondebasell with a density of 0.912 and a melt index of 0.3 measured at 230° C. and under 2.16 kg, or
Ineos TUB 350-HM00 with a density of 0.908 and a melt index of 0.3 measured at 230° C. and 2.16 kg.

Preferably, the polypropylene block copolymer or mixture of polypropylene block copolymers of the inner polymeric pipe sheath has a melting temperature (considering the peak corresponding to the highest melting temperature in differential scanning calorimetry (DSC) according to ISO 11357-3 of 2011) of at least 145° C., in particular at least 150° C., typically at least 155° C., and preferably at least 160° C.

Preferably, the polypropylene block copolymer has a degree of crystallinity of at least 40%, typically at least 50%, or the polypropylene block copolymer mixture comprises at least one polypropylene block copolymer having a degree of crystallinity of at least 40%, typically at least 50% (or each polypropylene block copolymer of the polypropylene block copolymer mixture has a crystallinity level of at least 40%, typically of at least 50%). The degree of crystallinity may be calculated by dividing the heat of fusion of the polypropylene block copolymer by the heat of fusion of a 100% crystalline polypropylene block copolymer, generally estimated at 209 joules/gram.

Such melting temperatures and crystallinity levels contribute to the fact that the polypropylene block copolymer or the mixture, and thus the internal polymeric sealing sheath, exhibit a swelling ratio and resistance to blistering in the presence of high temperature hydrocarbons that make it compatible with the use of the sheath as a sealing sheath intended to be in contact with hydrocarbons in a pipe for the transport of hydrocarbons.

Thus, typically, the polypropylene block copolymer or the mixture of polypropylene block copolymers of the inner polymeric pipe sheath has a swelling ratio of less than 30% by weight when contacted with Biofree EN 590 diesel at 110° C. for 6 hours. Typically, the swelling ratio is measured by weighing the $M_{initial}$ mass of a sheath sample before contacting Biofree EN 590 diesel. This sample is then contacted with Biofree EN 590 diesel at 110° C. for 6 hours, and then its $M_{final}$ mass is measured. The swelling ratio is then $(M_{final}-M_{initial})/M_{initial}$.

The mechanical properties of the inner pipe sealing sheath when cold are also important. Indeed, the temperatures on the production and storage sites of the pipe may be particularly low, for example between −20° C. and 30° C., while the sheath must preserve its characteristics at such temperatures. It is known that a polypropylene homopolymer has rather poor performance when cold, both in terms of impact resistance and elongation at break. Thus, by way of example, the elongation at break of the Hostallen PPH 2250 36 grade from Lyondellbasell is only 20% at 0° C., while its impact strength on the notched specimen is of the order of 6 kJ/m$^2$ at 0° C. In addition, large size spherulites may form and lead to a loss of mechanical properties during the preparation and cooling of a polypropylene homopolymer-based part of a certain thickness. Advantageously, polypropylene block copolymers offer better resistance to cold than polypropylene homopolymers.

Generally, the crystalline morphology of the polypropylene block copolymer is greater than 50% of the beta and/or alpha type, or the crystalline morphology of at least one polypropylene block copolymer of the polypropylene block copolymer mixture is greater than 50% of the beta type and/or alpha type (or the crystalline morphology of each polypropylene block copolymer of the polypropylene block copolymer mixture is more than 50% of the beta and/or alpha type). The presence and proportion of alpha or beta types may be measured by Differential Scanning calorimetry (DSC). Indeed, such polypropylene block copolymers offer improved mechanical performance when cold, including improved impact strength and elongation at break. A part prepared from a polypropylene block copolymer having a crystalline morphology of the beta and/or alpha type, has smaller-size spherolites. The structure of such a polypropylene block copolymer is thinner and more homogeneous, which has a favorable impact on the strength, the notched specimen resistance, and the weldability of the material. Such a structure is generally obtained by preparing the polypropylene(s) by polymerization in the presence of a betagenic nucleating agent (which promotes the formation of beta-type crystals), or an alphagenic nucleating agent (which promotes the formation of alpha-type crystals). The above-mentioned advantages obtained through the use of nucleating agents are seen in particular in the case of parts of high thicknesses, which is the case for the inner polymeric sealing sheath which may have a thickness of up to 150 mm.

Generally, the crystalline morphology of the polypropylene block copolymer is greater than 50% of the beta type, or the crystalline morphology of at least one polypropylene block copolymer of the polypropylene block copolymer mixture is greater than 50% of the beta type (or the crystalline morphology of each polypropylene block copolymer of the polypropylene block copolymer mixture is more than 50% of the beta type). Indeed, the alpha crystalline morphology has a coarse grain structure between the spherulites, which can lead to a brittle rupture of the polypropylene upon external stress. The molecular arrangement of the beta crystalline form allows an improvement of the impact and deformation properties of polypropylene with respect to the alpha phase. Such a structure is generally obtained by preparing the polypropylene(s) by polymerization in the presence of a betagenic nucleating agent.

Thus, the polymeric pipe sealing sheath according to the present invention comprises a polypropylene block copolymer or a mixture of polypropylene block copolymers having good impact resistance and good elongation at break at low temperature, which is particularly advantageous in the case where the pipe is a flexible pipe with a rough bore comprising a metal carcass. Indeed, the production of such a pipe involves extruding the polymeric sheath around the metal carcass. However, the outer face of the metal carcass is not smooth because it has at least one helical groove of generally large size, typically several millimeters in width and depth. As a result, during the extrusion of the inner polymeric sealing sheath, the molten polymer tends to flow inside this groove so that after cooling, the inner face of the inner polymeric sealing sheath comprises complementary geometrical protrusions of the grooves of the metal carcass. In addition, these geometrical irregularities of the inner face of the inner polymeric sealing sheath may generate high concentrations of stresses and mechanical deformations applied locally to the polymer material, in particular when the flexible pipe is wound on a small diameter coil, as is done several times during its manufacture. Since these winding and unwinding operations have to able to be done in winter when the temperature is low, it is necessary that the inner polymeric sealing sheath is sufficiently ductile at low temperature to support these operations without damage, despite the stress and strain concentrations related to the presence of the metal carcass. As a result, the good mechanical properties of the polypropylene block copolymers according to the present invention at low temperature, make it advantageously possible to use these materials to produce the inner polymeric sealing sheath for flexible pipes comprising a metal carcass.

The polypropylene block copolymers used in the inner polymeric pipe sealing sheath according to the invention are commercially available or may be prepared by processes known to those skilled in the art, in particular by Ziegler-Natta catalysis, by metallocene catalysis or any other type of catalysis.

Preferably, the polypropylene homopolymer may be obtained by polymerization in the presence of a betagenic nucleating agent (which promotes the formation of beta-type crystals) and/or an alphagenic nucleating agent (which promotes the formation of alpha-type crystals), or the polypropylene block copolymer mixture may comprise at least one polypropylene block copolymer obtainable by polymerization in the presence of a betagenic and/or an alphagenic nucleating agent (or each polypropylene block copolymer of the polypropylene block copolymer mixture may be obtained by polymerization in the presence of a betagenic and/or alphagenic nucleating agent). This agent may be introduced at any time, typically after the polymerization (for example during granulation) or may be added during the polymerization step. The addition of such a nucleating agent influences the formation of the polypropylene structure upon cooling of the molten polypropylene mass to produce a thinner and more homogeneous structure. The nucleating agents of the alphagenic and/or betagenic type make it possible to obtain smaller-size spherulites inside the polypropylene than when such agents are absent. Thus, their presence has a favorable impact on the strength, the notched specimen resistance, and the weldability of the resulting polypropylene sheath. The use of a betagenic nucleating agent is particularly preferred since the propylene so obtained has improved impact and deformation properties, as indicated above. There are alternative methods that may be used to obtain a polypropylene of beta crystalline morphology, for example by transformation/cooling, but such a process is generally more complex.

The polypropylene block copolymer forming the pipe may be crosslinked, or the polypropylene block copolymer mixture may comprise at least one crosslinked polypropylene block copolymer (or each polypropylene block copolymer of the polypropylene block copolymer mixture may be crosslinked).

The polypropylene block copolymer of the pipe may be uncrosslinked, or the polypropylene block copolymer mixture may comprise at least one uncrosslinked polypropylene block copolymer (or each polypropylene block copolymer of the polypropylene block copolymer mixture may be uncrosslinked).

In one embodiment, the inner polymeric sealing sheath is multilayer, for example two-layer or three-layer, wherein it should be understood that at least the layer that may be in contact with the hydrocarbons comprises polypropylene block copolymer as defined above, or the mixture of polypropylene block copolymers as defined above. The layer capable of being in contact with the hydrocarbons of the inner polymeric sealing sheath is the innermost layer of the sheath.

Preferably, the inner polymeric sealing sheath comprises only one layer.

The inner polymeric pipe sealing sheath comprising a polypropylene block copolymer or a polypropylene block copolymer mixture according to the invention (or at least the inner layer of the inner polymeric sealing sheath when it is multilayer) typically comprises:
 a polymeric matrix, and
 optionally, discontinuously dispersed components in the polymeric matrix.

The term "polymeric matrix" is understood to mean the continuous polymeric phase which forms the inner polymeric sealing sheath (or the layer of the inner polymeric sealing sheath). The polymeric matrix is a continuous matrix. The inner polymeric sheath (or layer) may optionally comprise discontinuously-dispersed components in the polymeric matrix, but which are not part of the polymeric matrix. Such components may, for example, be fillers such as fibers.

The polymeric matrix of the inner polymeric sheath (or the inner layer of the inner polymeric sealing sheath when it is multilayered) is generally obtained by extrusion of one or more polymers (which form the polymeric matrix), and possibly additives (masterbatch). During the extrusion, some additives are incorporated in the polymer matrix, while others do not mix with the polymers forming the polymeric matrix and disperse discontinuously in the polymer matrix, to form discontinuously-dispersed components in the polymeric matrix.

According to a first alternative, the pipe according to the invention comprises at least one inner polymeric sealing sheath, the polymer matrix of which comprises a polypropylene block copolymer or a mixture of polypropylene block copolymers. If the inner polymeric sealing sheath is multilayer, the polymeric matrix of at least the inner layer of the sheath comprises a polypropylene block copolymer or a mixture of polypropylene block copolymers.

According to this alternative, the inner polymeric sheath whose polymer matrix comprises a polypropylene block copolymer or a mixture of polypropylene block copolymers, is generally obtained by extrusion of one or more polymers (which form the polymeric matrix), wherein at least one of them is a polypropylene block copolymer, and, optionally, in the presence of additives. If the inner polymer sheath is multilayer, its inner layer is generally obtained by coextrusion of on the one hand one or more polymers (which form(s) the polymeric matrix of the inner layer), wherein at least one of them is a polypropylene block copolymer, optionally in the presence of additives, and, on the other hand, another or other polymer(s) which form the other layer(s) of the inner multilayer polymeric sealing sheath. The discontinuously-dispersed components in the polymeric matrix may optionally comprise polymers, for example a polypropylene block copolymer or a mixture of polypropylene block copolymers. This being so, a pipe:

comprising a polymeric sealing sheath comprising a component dispersed discontinuously in the polymeric matrix (in particular fillers such as fibers) comprising or consisting of a polypropylene block copolymer or a mixture of polypropylene block copolymers, but whose polymeric matrix is free of a polypropylene block copolymer or a mixture of polypropylene block copolymers, does not meet the definition of a pipe comprising at least one polymeric sealing sheath whose polymeric matrix comprises a polypropylene block copolymer or a polypropylene block copolymer mixture, as defined in this first alternative.

According to a second alternative, the pipe according to the invention may comprise at least one inner polymeric sealing sheath comprising a discontinuously-dispersed component in the polymeric matrix, said component comprising a polypropylene block copolymer or a mixture of polypropylene block copolymers. If the inner polymeric sheath is multilayer, then at least its inner layer comprises a discontinuously-dispersed component in the polymeric matrix, wherein the component comprises a polypropylene block copolymer or a mixture of polypropylene block copolymers.

According to this second alternative, a discontinuously-dispersed component in the polymeric matrix of the inner polymeric sealing sheath (or at least its inner layer when the sheath is multilayer) comprises a polypropylene block copolymer or a mixture of polypropylene block copolymers. The component may be a filler such as a fiber. The component comprising a polypropylene block copolymer or a mixture of polypropylene block copolymers is generally one of the additives of the masterbatch used during the extrusion. According to this second alternative, the polymeric matrix of the inner polymeric sealing sheath may be free of polypropylene block copolymer.

According to a third alternative, the pipe according to the invention may comprise at least one inner polymeric sealing sheath comprising a discontinuously-dispersed component in the polymeric matrix, wherein the component comprises a polypropylene block copolymer or a mixture of polypropylene block copolymers and whose polymer matrix comprises a polypropylene block copolymer or a mixture of polypropylene block copolymers. If the inner polymer sheath is multilayer, at least its inner layer comprises a discontinuously-dispersed component in the polymeric matrix, wherein the component comprising a polypropylene block copolymer or a mixture of polypropylene block copolymers, and the polymeric matrix of at least its inner layer comprises a polypropylene block copolymer or a mixture of polypropylene block copolymers.

According to this third alternative, the polypropylene block copolymer or the polypropylene block copolymer mixture is therefore present both in the polymer matrix and in a component dispersed discontinuously in the polymer matrix.

Generally, the weight proportion of the polypropylene block copolymer or of the polypropylene block copolymer mixture in the inner polymeric sheath (or in at least the inner layer of the sheath when the inner polymeric sheath is multilayer) is greater than 50% by weight, in particular greater than 70% by weight relative to the inner polymeric sealing sheath.

The inner polymeric sealing sheath (or at least the inner layer of the sheath when the inner polymeric sheath is multilayer) may also include a plasticizer, which may limit the swelling rate of the sheath upon contact with hydrocarbons in addition to improving the cold performance of the sheath (thanks to the lowering of the glass transition temperature by 10° C., or even 25° C. as may be measured by DSC). Without wishing to be bound by a particular theory, the limitation of the swelling rate of the sheath upon contact with the hydrocarbons could be explained by the fact that, under the normal conditions of use of the inner sealing sheath, the plasticizer would tend to escape from the sheath which would lead to a mass loss in the sheath, which would be offset by hydrocarbons that have a high affinity with the polypropylene block copolymer. For example, in the case of a sheath having a predictable swelling rate of 30%, an addition of 10% by mass of plasticizer could lead to a final effective swelling of 20%.

The plasticizer may, for example, be chosen from the compounds defined in the book Handbook of Plasticizers edited by Georges Wypych. Examples include dibutyl sebacate, dioctyl phthalate, N-n-butylsulfonamide, polymeric polyesters and combinations thereof.

Advantageously, the inner polymeric sealing sheath comprises between 0% and 20% by weight of plasticizer, preferably between 1% and 10% by weight of plasticizer.

The inner polymeric sealing sheath (or at least the inner layer of the sheath when the inner polymeric sheath is multilayer) may also include a impact modifier, which improves its cold behavior. Examples of impact modifiers are described in the literature. The following commercial references are nonlimiting: Exact™ plastomer from Exxon Mobil, Novalene from Nova polymers Inc., Engage™ 8100 from Dow Chemical, etc.

The inner polymeric sealing sheath comprises between 0% and 20% impact modifier and preferably between 1% and 10% impact modifier.

The inner polymeric sealing sheath comprising a polypropylene block copolymer or a mixture of polypropylene block copolymers (or at least the inner layer of the sheath when the inner polymeric sheath is multilayer) may comprise other additives, such as antioxidants, anti-UV, reinforcing fillers, manufacturing aids and other fillers usually used in thermoplastics.

Typically, the inner polymeric sealing sheath (or at least the inner layer of the sheath when the inner polymeric sheath is multilayer) consists of:
- 50 to 100% by weight of polypropylene block copolymer or a mixture of polypropylene block copolymers,
- 0 to 20% by weight of plasticizer,
- 0 to 20% by weight of impact modifier,
- 0 to 10% by weight of additives.

The underwater pipe according to the invention may be rigid or flexible. Typically, the minimum bend radius (MBR) of a rigid pipe is 10 times greater than that of a flexible pipe. Given the MBR of a flexible pipe, its inner sealing sheath may be subject to significant stressful bending. The mechanical characteristics of the flexible pipe must allow it to respond to forces (due to the winding of the flexible pipe with radii of curvature 10 times smaller than a rigid pipe) that are greater than those to which a rigid pipe is subjected.

According to a first alternative, the underwater pipe according to the invention is flexible. Generally, its metal reinforcing layer is then constituted by a long-pitch winding of at least one non-contiguous wire, typically a tensile armor ply.

The flexible pipe typically comprises, from the outside to the inside of the pipe:
- at least one tensile armor ply as reinforcing layer,
- the inner polymeric sealing sheath,
- possibly a metal carcass.

If the pipe comprises a metal carcass, it is said to have a rough-bore. If the pipe is free of a metal carcass, it is said to be smooth-bore.

The main function of the metal carcass is to take up radial forces directed from the outside to the inside of the pipe in order to avoid the collapse of all or part of the pipe under the effect of these forces. These forces are, in particular, related to hydrostatic pressure exerted by seawater when the flexible pipe is submerged. Thus, the hydrostatic pressure may reach a very high level when the pipe is immersed at great depth, for example 200 bar when the pipe is submerged at a depth of 2000 m, so that it is then often necessary to equip the flexible pipe with a metal carcass.

When the flexible pipe comprises an outer polymeric sheath, the metal carcass also has the function of preventing the collapse of the inner polymeric sealing sheath upon rapid decompression of a flexible pipe having transported hydrocarbons. Indeed, the gases contained in the hydrocarbons diffuse slowly through the inner polymeric sealing sheath and are found partly trapped in the annular space between the inner polymeric sealing sheath and the outer polymeric sheath. As a result, during a production shut-down resulting in rapid decompression of the inside of the flexible pipe, the pressure in this annular space may temporarily become significantly greater than the pressure inside the pipe, which, in the absence of a metal carcass, would lead to the collapse of the inner polymeric sealing sheath.

As a result, generally, for the transport of hydrocarbons, a pipe comprising a metal carcass is preferred, whereas a pipe without a metal carcass is suitable for the transport of water and/or water vapor under pressure. In addition, when the pipe is intended both to carry hydrocarbons and to be submerged at great depth, then the metal carcass becomes indispensable in most applications.

The metal carcass consists of longitudinal elements wound helically with a short pitch. These longitudinal elements are stainless steel strips or wire arranged in turns and stapled to each other. Advantageously, the metal carcass is made by profiling an S-shaped strip and then winding it in a helix in order to staple the adjacent turns together.

In the present application, the concept of short-pitch winding designates any helical winding at a helix angle close to 90°, typically between 75° and 90°. The concept of long-pitch winding covers helical angles less than 60°, typically between 20° and 60° for armor plies.

The tensile armor plies consist of metal or composite wire wound in a long pitch and their main function is to take up the axial forces related, on the one hand, to the inner pressure inside the flexible pipe and, on the other hand, the weight of the flexible pipe, in particular when it is suspended. The presence of an additional metallic reinforcing layer that is intended to take up the radial forces related to the inner pressure, in particular a so-called "pressure vault" layer, is not indispensable when the helix angles of the wires constituting the layers of tensile armor are close to 55°. Indeed, this particular helix angle gives the tensile armor plies the ability to take up, in addition to axial forces, the radial forces exerted on the flexible pipe and directed from the inside to the outside of the pipe.

In a preferred manner, and, in particular, for applications at great depth, in addition to the tensile armor plies, the flexible pipe may comprise a pressure vault interposed between the inner polymeric sheath and the tensile armor plies. In such a case, the radial forces exerted on the flexible pipe, in particular the radial forces directed from the inside towards the outside of the pipe, are taken up by the pressure vault in order to avoid the bursting of the inner polymeric sheath under the effect of the pressure prevailing inside the pipe. The pressure vault consists of longitudinal elements wound with a short pitch, for example metal wires of Z (zeta), C, T (theta), U, K or X form, arranged in turns stapled to each other.

Advantageously and, in particular, as a function of the grade of the constituent metallic material of the tensile armor plies and of the possible pressure vault, the flexible conduit may comprise an outer polymeric sealing sheath to prevent seawater from entering within the flexible pipe. This makes it possible, in particular, to protect the tensile armor plies from seawater and to prevent the phenomenon of corrosion by seawater.

The nature, number, sizing and organization of the layers constituting the flexible pipes are essentially related to their conditions of use and installation. The pipes may comprise additional layers to those mentioned above.

These flexible pipes are particularly suitable for the transport of fluids, especially hydrocarbons on the seabed and at great depths. More precisely, they are referred to as unbonded and are so described in the normative documents published by the American Petroleum Institute (API), API 17J (3rd edition—Jan. 1, 2009) and API RP 17B. (4th edition—July 2008).

Flexible pipes may be used at great depth, typically up to 3000 meters deep. They allow the transport of fluids, especially hydrocarbons, having a temperature typically reaching 130° C., and may even exceed 150° C., with an inner pressure of up to 1000 bar or 1500 bar.

The inner polymeric sheath of the flexible pipe is typically tubular, and generally has a diameter of 50 mm to 600 mm, preferably 50 to 400 mm, and/or a thickness of 1 mm to 150 mm, preferably 4 to 15 mm and/or a length of 1 m to 10 km.

According to a second alternative, the underwater pipe according to the invention is rigid. Typically, it then comprises, from the outside towards the inside, a metal reinforcing layer and the inner polymeric sealing sheath comprising a polypropylene block copolymer or a mixture of polypropylene block copolymers with density and melt indices as defined above (FIG. 2).

The inner polymeric sealing sheath then corresponds to the "liner" of the rigid pipe. It typically has a thickness up to 15 mm. The outer diameter of the inner polymeric sealing sheath is generally between 10 cm and 130 cm.

The metal reinforcing layer of the rigid pipe is generally made of a metal tube. The metal reinforcing layer is, for example, made of steel, stainless steel and/or other steels with variable nickel content.

The rigid pipe may further comprise an envelope for thermal insulation and/or protection, and which may be in the form of a steel outer tube or in the form of a polymer layer.

More particularly, a rigid pipe typically comprises a set of sections arranged end to end, wherein each has a length generally between 12 m and 96 m. The thermal insulation and/or protection envelope is typically a melt-bonded epoxy, polypropylene or polyethylene layer, and typically of a thickness between 2 mm and 4 mm, or a steel tube.

A pipe comprising an inner polymeric sealing sheath comprising a polypropylene block copolymer or a mixture of polypropylene block copolymers has the following advantages:
- the inner polymeric sealing sheath has a swelling rate and resistance to blistering when it is brought into contact with hydrocarbons at high temperatures that are compatible with its use as a inner polymeric pipe sealing sheath for the transport of hydrocarbons. In particular, the inner polymeric sealing sheath is able to withstand violent decompressions, as observed during production shut-downs, with good resistance to blistering.
- Its swelling rate is lower and its resistance to blistering is improved compared to a sheath based on a different propylene (PPB, PPR or PPH not having the density and melt index characteristics defined in the application).
- The inner polymeric sealing sheath is much cheaper (up to 15 times less) than an inner sealing sheath based on polyamide or PVDF.
- The inner polymeric sealing sheath does not exhibit chemical aging, unlike a polyamide sheath.
- The inner polymeric sealing sheath is usable in a flexible pipe of the "smooth bore" as "rough bore" type,
- Polypropylene has thermal insulation properties superior to polyamide or polyethylene. Thus, it eliminates an insulating sheath that is usually added to the pipes.

According to a second object, the invention relates to a method for preparing the underwater pipe defined above, comprising the following steps:
a) extrusion to form the inner polymeric sealing sheath comprising the polypropylene block copolymer or the polypropylene block copolymer mixture, wherein the extrusion is possibly carried out on another layer,
b) assembling the inner polymeric sealing sheath obtained in step a) with the metal reinforcing layer.

The extrusion step a) may be carried out by any method known to those skilled in the art, for example using a single screw or twin screw extruder.

A polymeric matrix comprising a polypropylene block copolymer or a mixture of polypropylene block copolymers may easily be extruded. When the inner polymeric sealing sheath comprises several polymers, the mixture of the two polymers may be made before or during extrusion.

When the inner polymeric sheath is multilayer, the inner layer comprising a polypropylene block copolymer or a polypropylene block copolymer mixture, may easily be coextruded with the other layer(s) of the inner polymeric sealing sheath.

When the polypropylene block copolymer of the pipe is crosslinked, or when the polypropylene block copolymer mixture comprises at least one crosslinked polypropylene block copolymer, the method comprises an additional step c) of crosslinking.

Depending on the crosslinking pathways, the c) crosslinking step may be carried out through a wet or heated pathway before or after the step b) of assembly.

For example, the crosslinking may be obtained by the peroxide pathway. The extrusion step a) is then carried out in the presence of a crosslinking initiator making it possible to generate free radicals, typically a peroxide. The peroxide is advantageously chosen as a function of the extrusion parameters of the polypropylene block copolymer or of the polypropylene block copolymer mixture. For example, the activation temperature should preferably be greater than the extrusion temperature of the polypropylene block copolymer or polypropylene block copolymer mixture according to the invention in order to prevent crosslinking from occurring during the extrusion step a). The crosslinking step c) is then carried out thermally. For example, an infrared radiation oven is arranged at the extrusion line outlet in order to thermally activate the crosslinking. The assembly step b) is then performed.

Alternatively, the crosslinking may be obtained by the silane pathway. According to this crosslinking pathway, the extrusion step a) is carried out with a polypropylene block copolymer or a polypropylene block copolymer mixture onto which has previously been grafted one or more alkoxy-silane groups. Advantageously, the polypropylene block copolymer or polypropylene block copolymer mixture to which one or more alkoxy-silane groups has previously been grafted has a melt index measured at 230° C. under a mass of 2.16 kg of less than 10 g/10 minutes, advantageously less than 5 g/10 minutes, typically less than 5 g/10 minutes, in particular less than 2 g/10 minutes, preferably less than 0.5 g/10 minutes. The c) crosslinking step is carried out wet after the extrusion step a) and advantageously after the assembly step b). For example, water is circulated inside the pipe obtained in step b). In order to promote crosslinking, wherein the temperature of the circulating water is generally greater than 80° C., greater than 100° C. and advantageously greater than 120° C.

The grafting of one or more alkoxy-silane groups onto the polypropylene block copolymer or onto the polypropylene block copolymer mixture may be carried out according to several methods known to those skilled in the art. For example, the polypropylene block copolymer or the polypropylene block copolymer mixture may be extruded in the form of a rod in the presence of a crosslinking initiator making it possible to generate free radicals, wherein a monomer has one or more alkoxy-silane groups, and a catalyst. The catalyst is mainly preserved so that it does not generate radicals within the extruder. At the extrusion outlet, the rod is cooled and granulated. Then the grafting step is carried out by post-baking the granules at a temperature allowing the grafting of the monomer having one or more alkoxy-silane groups.

Silane crosslinking is more advantageous than peroxide crosslinking because it makes it possible to obtain crosslinked polypropylene block copolymers with a higher molecular weight. The pipe thus obtained has high-temperature mechanical properties that are significantly improved compared to the crosslinking obtained with peroxide. Also, the silane pathway offers an easier method of implementation, in particular, as the crosslinking step c) does not require development of the particularly expensive extrusion line, such as a crosslinking oven.

Advantageously, the degree of crosslinking is greater than 50% and preferably greater than 75%, measured according to ASTM D2765-11.

Typically, when the underwater pipe is an underwater flexible pipe, the method comprises the following steps:

a) extrusion to form an inner polymeric sealing sheath comprising polypropylene block copolymer as defined above, or the mixture of polypropylene block copolymers as defined above, wherein the extrusion is possibly carried out on a carcass, b) assembling the inner polymeric sealing sheath obtained in step a) with at least one tensile armor ply (usually two armor plies).

If the extrusion of step a) is not carried out on a carcass, but independently, the resulting flexible pipe is smooth bore.

If the extrusion of step a) is carried out on a carcass, the resulting flexible pipe is rough bore.

When the flexible pipe comprises other layers, the method comprises step b) of assembling the inner polymeric sealing sheath obtained in step a) with the other layers to form the flexible underwater pipe such as the pressure vault and/or the outer polymeric sealing sheath. The layers are thus assembled to form an unbonded flexible pipe as described in the normative documents published by the American Petroleum Institute (API), API 17J and API RP 17B.

Typically, when the underwater pipe is a rigid underwater pipe, the method comprises the following steps:

a) extrusion to form the inner polymeric sealing sheath comprising the polypropylene block copolymer or polypropylene block copolymer mixture, b) assembly of the inner polymeric sealing sheath obtained in step a) with the metal tube.

According to a third object, the invention concerns an underwater pipe obtainable by the aforementioned method.

According to a fourth object, the invention concerns the use of the abovementioned underwater pipe for the transport of hydrocarbons.

According to a fifth object, the invention concerns the use of a polypropylene block copolymer or of a polypropylene block copolymer mixture, wherein the polypropylene block copolymer or the mixture has:

a density (according to ISO 1183 revised in 2012) of more than 0.900 g/cm$^3$, and a melt index (according to ISO 1133 revised in 2011) measured at 230° C. under a mass of 2.16 kg of less than 10 g/10 minutes, in an inner polymeric sealing sheath of an underwater pipe for the transport of hydrocarbons. The embodiments described above are, of course, applicable.

Other features and advantages of the invention appear upon reading the description given below of particular embodiments of the invention, given for information but not limiting, with reference to FIGS. 1 and 2.

Figure 1:
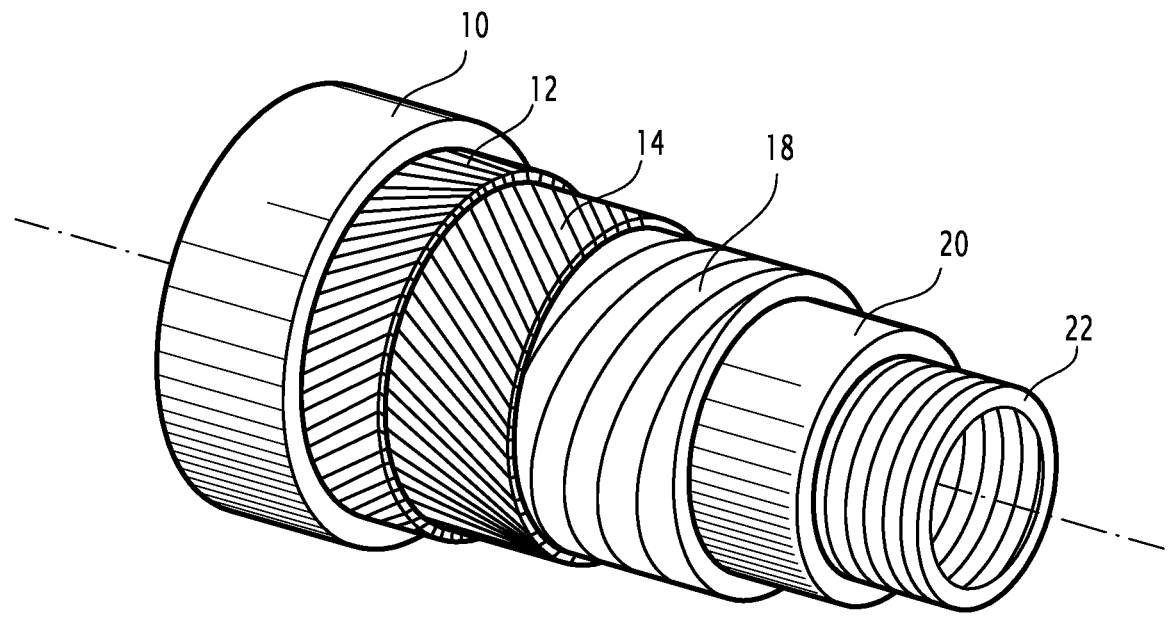
FIG. 1 shows a partial schematic perspective view of a flexible pipe according to the invention. It illustrates a pipe according to the invention comprising, from the outside to the inside.

an outer polymeric sheath 10,
an outer ply of tensile armor 12,
an inner ply of tensile armor 14 wound in the opposite direction to the outer ply 12,
a pressure vault 18 to take up the radial forces generated by the pressure of the hydrocarbons transported,
an inner polymeric sheath 20, and
an inner carcass 22 to take up radial crushing forces,
wherein the inner polymeric sealing sheath 20 comprises a polypropylene block copolymer or a polypropylene block copolymer mixture with a density and melt index as defined above.

Due to the presence of the inner carcass 22, this pipe is said to be rough bore. The invention could also be applied to a so-called smooth-bore pipe, which does not include an inner carcass.

Likewise, the scope of the present invention is not exceeded by eliminating the pressure vault 18, insofar as the helix angles of the threads constituting the armor plies 12, 14 are close to 55° and in the opposite direction.

The armor plies 12, 14 are obtained by long-pitch winding of a set of metal or composite material wires, generally of substantially rectangular section. The invention also applies if these wires have a section of circular or complex geometry, for example of the auto-stapled T type. FIG. 1 shows only two armor plies 12 and 14, but the pipe could also include one or more additional armor pairs. The armor ply 12 is said to be external because it is here the outermost, starting from the inside of the pipe, before reaching the outer sealing sheath 10.

The flexible pipe may also comprise layers not shown in FIG. 1, such as:

a holding layer between the outer polymeric sheath 10 and the tensile armor plies 12 and 14, or between two tensile armor plies, one or more anti-wear layers of polymeric material in contact either with the inner face of the aforementioned holding layer, or with its outer face, or with both faces, wherein this anti-wear layer prevents the holding layer from wear through contact with metal armor. Anti-wear layers, which are well known to those skilled in the art, are generally made by helical winding of one or more ribbons obtained by extrusion of a polymeric material based on polyamide, polyolefins, or PVDF (polyvinylidene fluoride). Reference may also be made to the document WO 2006/120320 which describes anti-wear layers consisting of polysulfone (PSU), polyethersulfone (PES), polyphenylsulfone (PPSU), polyetherimide (PEI), polytetrafluoroethylene (PTFE), polyetheretherketone (PEEK) or phenylene polysulfide (PPS) ribbons.

Figure 2:
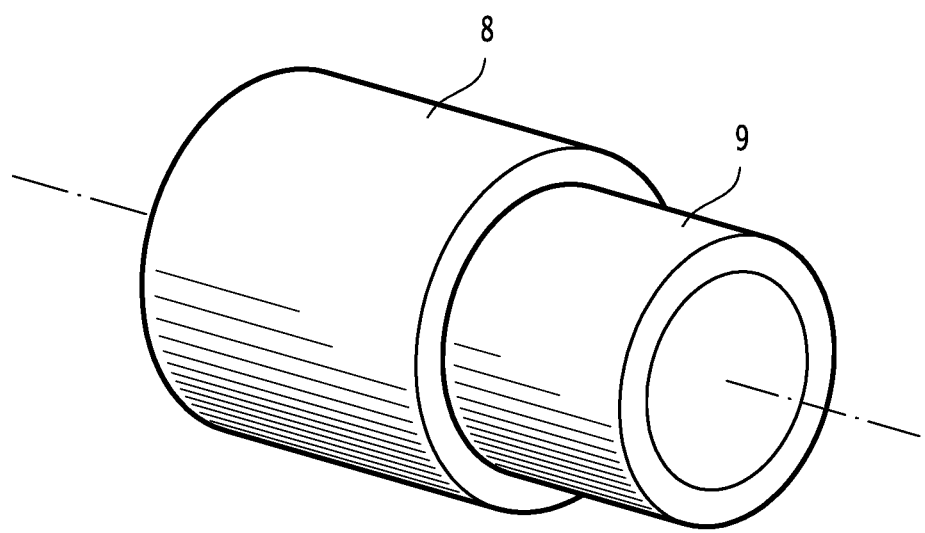

FIG. 2 shows a partial schematic perspective view of a rigid pipe according to the invention. It illustrates a pipe according to the invention comprising, from the outside to the inside:

a metal reinforcing layer 8,
an inner polymer polymeric sheath 9 comprising a polypropylene block copolymer or a mixture of polypropylene block copolymers of density and melt index as defined above.

EXAMPLE

Example 1: Swelling Rate of Polypropylenes in the Presence of a Petroleum Fluid at Elevated Temperature Samples of different families of polypropylene were weighed and then contacted with a petroleum fluid: the Biofree EN 590 diesel, and then weighed after contact for a certain time in this fluid. The difference in mass before and after contacting makes it possible to determine the degree of swelling.

The swelling rate (mass percentage) of various families of polypropylene in the presence of a petroleum fluid: the Biofree EN 590 diesel, were compared and are provided in Table 1.

TABLE 1

Swelling rate of various polypropylenes in the presence of Biofree EN 590 diesel

| polypropylene | | fluid index according to ASTM D1238 (g/10 min) | density according to ISO 1183 revised in 2012 | swelling rate in presence of Biofree EN 590 diesel | | |
|---|---|---|---|---|---|---|
| | | | | at 110° C. after 6 h | at 110° C. after 188 h | at 120° C. after 115 h |
| syndiotactic homopolymer | FINAPLAST 1251 from Total | 2.0 | 0.88 | 31% | x | x |
| random copolymer | PPC 3221 from Total | 1.8 | 0.902 | 110% | x | x |
| block copolymer | PPH3666 from Total | 1.5 | 0.905 | 17% | 48% | 53% |
| block copolymer | PPC 1640 from Total | 0.3 | 0.905 | 23% | 45% | 56% |
| block copolymer | PPC 1645 from Total | 0.3 | 0.905 | 15% | 28% | 37% |
| metallocene random copolymer | Lumicene MR10MX0 from Total | 10 | 0.902 | 88% | x | x |

These results show that the polypropylene block copolymers used in the sheath of the pipe according to the invention have a low swelling rate in the presence of hydrocarbons at high temperatures.

Example 2: Resistance of Polypropylenes Upon Violent Decompressions

Several polypropylenes were saturated with gas at high temperatures and pressures, and then the pressure was lowered to atmospheric pressure (1 bar) at a decompression rate of 70 bar/min similar to the operation of a flexible pipe. The appearance of blisters on the surface of the polypropylenes after this treatment was followed (Table 2).

TABLE 2 appearance of blisters on the surface of various polypropylenes after violent decompressions

| polypropylene | | fluid index according to ASTM D1238 (g/10 min) | density according to ISO 1183 revised in 2012 | conditions of pressurization | | blistering |
|---|---|---|---|---|---|---|
| | | | | gas | temperature and pressure | |
| block copolymer | PPC 3645 from Total | 1.3 | 0.905 | mixture 85% $CH_4$/15% $CO_2$ | 200 bar and 120° C. | no |
| block copolymer | PPC 1645 from Total | 0.3 | 0.905 | mixture: 85% $CH_4$/15% $CO_2$ | 200 bar and 110° C. | no |
| random copolymer | PPR 3221 from Total | 1.8 | 0.902 | mixture 85% $CH_4$/15% $CO_2$ | 200 bar and 110° C. | yes |
| syndiotactic copolymer | FINAPLAS 1251 from Total | 2 | 0.88 | mixture 85% $CH_4$/15% $CO_2$ | 200 bar and 110° C. | yes |

These results show that the polypropylene block copolymers used in the pipe according to the invention are capable of withstanding violent decompressions simulating production shut-downs.

The invention claimed is:

1. An underwater pipe for the transport of hydrocarbons comprising a metal reinforcing layer around an inner polymeric sealing sheath capable of being in contact with the hydrocarbons, wherein the inner polymeric sealing sheath comprises a polypropylene block copolymer or a mixture of polypropylene block copolymers, wherein the polypropylene block copolymer or the mixture has:
   a density greater than 0.900 g/cm³, and
   a melt index measured at 230° C. under a mass of 2.16 kg of less than 10 g/10 minutes.

2. The underwater pipe according to claim 1, wherein the polypropylene block copolymer or the polypropylene block copolymer mixture has:
   a density greater than 0.902 g/cm³, and/or
   a melt index measured at 230° C. under a mass of 2.16 kg of less than 5 g/10 min.

3. The underwater pipe according to claim 1, wherein the polypropylene block copolymer or polypropylene block copolymer mixture has a melting temperature of at least 145° C.

4. The underwater pipe according to claim 1, wherein the polypropylene block copolymer has a degree of crystallinity of at least 40%, or the polypropylene block copolymer mixture comprises at least one polypropylene block copolymer having a degree of crystallinity of at least 40%.

5. The underwater pipe according to claim 1, wherein the polypropylene block copolymer or the polypropylene block copolymer mixture has a swelling rate of less than 30% by weight when it is brought into contact with Biofree EN 590 diesel at 110° C. for 6 hours.

6. The underwater pipe according to claim 1, wherein the polypropylene block copolymer, or the at least one polypropylene block copolymer of the polypropylene block copolymer mixture, has a crystalline morphology of more than 50% of the beta and/or alpha type.

7. The underwater pipe according to claim 1, wherein the polypropylene block copolymer, or the at least one polypropylene block copolymer of the polypropylene block copolymer mixture, is obtained by polymerization in the presence a betagenic or alphagenic nucleating agent.

8. The underwater pipe according to claim 1, wherein the weight proportion of the polypropylene block copolymer, or polypropylene block copolymer mixture, in the inner polymeric sealing sheath is greater than 50% by weight, relative to the inner polymeric sealing sheath.

9. The underwater pipe according to claim 1, wherein the polypropylene block copolymer is crosslinked, or the polypropylene block copolymer mixture comprises at least one crosslinked polypropylene block copolymer.

10. The underwater pipe according to claim 1, wherein the inner polymeric sealing sheath comprises:
    from 0 to 20% by weight of plasticizer, and/or
    from 0 to 20% by weight of impact modifier.

11. The underwater pipe according to claim 1, which is a rigid pipe, and wherein the metal reinforcing layer consists of a metal tube.

12. A method for transporting hydrocarbons wherein hydrocarbons are transported in the underwater pipe according to claim 1.

13. The underwater pipe according to claim 1, which is a flexible pipe, and wherein the reinforcing layer consists of a long pitch winding of at least one wire with non-contiguous turns.

14. The underwater pipe according to claim 13, comprising, from the outside to the inside:
    at least one layer of tensile armor as reinforcing layer,
    the inner polymeric sealing sheath, and
    a metal carcass.

15. A method for preparing the underwater pipe according to claim 1, comprising the following steps:
    a) extrusion to form the inner polymeric scaling sheath comprising the polypropylene block copolymer or the polypropylene block copolymer mixture, wherein the extrusion is possibly carried out on another layer, b) assembling the inner polymeric sealing sheath obtained in step a) with the metal reinforcing layer.

* * * * *